United States Patent [19]
Park

[11] Patent Number: 5,878,315
[45] Date of Patent: Mar. 2, 1999

[54] ELECTROPHOTOGRAPHIC PRINTER

[75] Inventor: Geun-yong Park, Suwon, Rep. of Korea

[73] Assignee: Samsung Electronics Co., Ltd., Kyungki-Do, Rep. of Korea

[21] Appl. No.: 910,274

[22] Filed: Aug. 13, 1997

[30] Foreign Application Priority Data

Aug. 30, 1996 [KR] Rep. of Korea ................ 1996-37224

[51] Int. Cl.⁶ .................................................. G03G 15/16
[52] U.S. Cl. ............................................................ 399/309
[58] Field of Search ................................. 399/309, 308, 399/306, 302, 364, 388, 297, 130, 107, 154, 121, 66

[56] References Cited

U.S. PATENT DOCUMENTS 4,688,925  8/1987  Randall ................................. 399/309

FOREIGN PATENT DOCUMENTS

047820A1  4/1992  European Pat. Off. .
2317144   3/1998  United Kingdom .
9308511   4/1993  WIPO .

Primary Examiner—Arthur T. Grimley
Assistant Examiner—Hoan Tran
Attorney, Agent, or Firm—Sughrue, Mion, Zinn, Macpeak & Seas, PLLC

[57] ABSTRACT

An electrophotographic printer includes first and second transcription rollers for printing an image transcribed from a photosensitive drum on a first surface of a paper. The printer further includes third and fourth transcription rollers positioned to one side of the first and second transcription rollers and movable up and down for selectively contacting the photosensitive drum, thereby to print the image transcribed from the photosensitive drum on a second surface of the paper. Accordingly, both surfaces of the paper can be printed by passing a paper through the printer only once.

5 Claims, 2 Drawing Sheets

ELECTROPHOTOGRAPHIC PRINTER

BACKGROUND OF THE INVENTION

The present invention relates to an electrophotographic printer and, more particularly, to an electrophotographic printer capable of printing both surfaces of a paper.

In general, an electrophotographic printer such as a laser printer, includes a high speed rotating mirror for reflecting a laser beam onto a photosensitive drum, a feed roller for supplying paper to the photosensitive drum, a compression roller for pressing against a rear surface of the supplied paper as the paper passes through the photosensitive drum being in contact therewith, and an output roller for outputting the printed paper.

However, in the conventional electrophotographic printer, only one surface of the paper at a time can be printed. That is, an image reflected on the rotating mirror is transcribed to one surface of the supplied paper through the photosensitive drum. In order to print both surfaces of the paper, the paper with one printed surface must be re-supplied to the printer to print on the other surface thereof. Therefore, a complicated and lengthy process is required for two-sided printing.

SUMMARY OF THE INVENTION

To solve the above problem, it is an object of the present invention to provide an electrophotographic printer capable of printing both surfaces of a paper by supplying paper to the printer only once.

To accomplish the above object, there is provided an electrophotographic printer, comprising: a photosensitive device in which an image for one surface of a supplied paper to be printed and an image for an opposite surface of the supplied paper to be printed become photosensitive; a first means for printing the image for the one surface and which is transcribed by contact with said photosensitive device on the one surface of the supplied paper; and a second means, installed at one side of said first print means to selectively contact said photosensitive device, for printing the image for the opposite surface and which is transcribed from said photosensitive device on the opposite surface of the supplied paper.

Preferably, the photosensitive device is a rotatable photosensitive drum.

Also, the first print means comprises a first transcription roller rotating in contact with said photosensitive drum and transcribing the image for the one surface of the supplied paper from said photosensitive drum, and a second transcription roller rotating in contact with said first transcription roller to pass the supplied paper therebetween.

Further, the second print means comprises a third transcription roller rotating selectively in contact with said photosensitive drum, and transcribing the image for the opposite surface of the supplied paper from said photosensitive drum, a fourth transcription roller having a circumferential length that is longer than the length of the supplied paper, rotating in contact with said third transcription roller and transcribing the image for the opposite surface of the supplied paper from said third transcription roller, a bracket supporting said third and fourth transcription rollers and operative to be lifted and lowered with respect to said photosensitive drum, an elevating mechanism which elevates said bracket, to thereby enable said third transcription roller to selectively contact said photosensitive drum, and a driving source for driving at least one of said third and fourth transcription rollers.

BRIEF DESCRIPTION OF THE DRAWINGS

The above objects and advantages of the present invention will become more apparent by describing in detail a preferred embodiment thereof with reference to the accompanying drawings, in which.

DETAILED DESCRIPTION OF THE INVENTION

Figure 1:
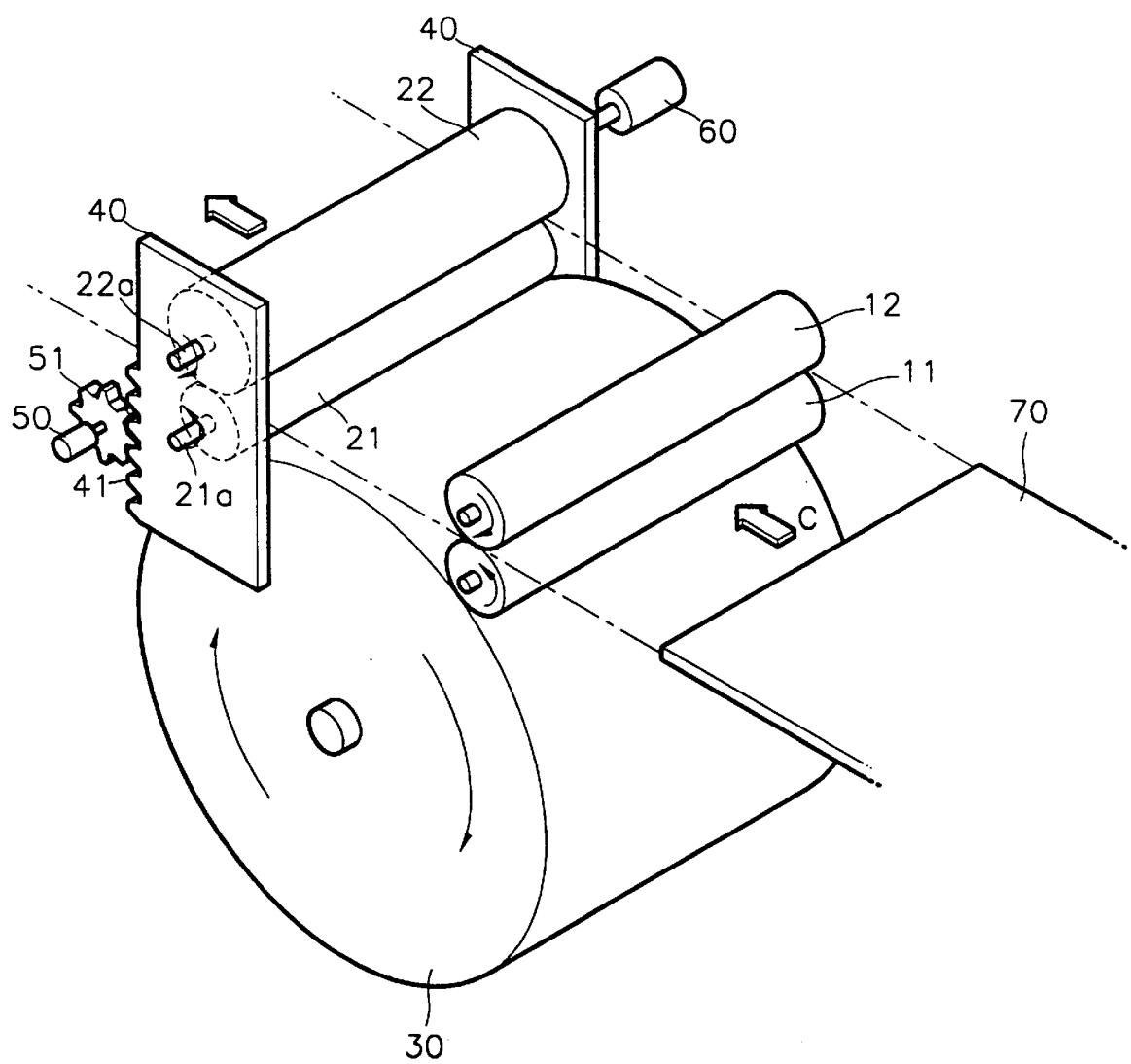
FIG. 1 is a schematic perspective view showing an electrophotographic printer according to the present invention.

Referring to FIG. 1, the electrophotographic printer according to the present invention includes first and second transcription rollers 11 and 12 rotating along a proceeding direction "C" of a supplied paper 70, being in contact with each other, and a photosensitive drum 30 contacting the first transcription roller 11.

The photosensitive drum 30 has an outer surface which becomes photosensitive by a laser reflected on the rotating mirror (not shown), so that an image to be printed is transcribed to the first transcription roller 11.

Third and fourth transcription rollers 21 and 22 are installed at one side of the first and second transcription rollers 11 and 12 along a proceeding direction of the paper 70. The third transcription roller 21 contacts the outer surface of the photosensitive drum 30. Rotation shafts 21a and 22a of the third and fourth transcription rollers 21 and 22 are rotatably supported by a bracket 40. An elevating motor 50 is installed at one side of the bracket 40, and a pinion 51 connected to the rotation shaft of the elevating motor 50 engages with a rack 41 formed on the bracket 40. Accordingly, the bracket 40 is elevated vertically by the rotation of the elevating motor 50, and thus the third transcription roller 21 selectively contacts the photosensitive drum 30.

The fourth transcription roller 22 is rotated by a driving motor 60. Also, preferably, the circumferential length of the photosensitive drum 30 is two or more times the length of the supplied paper 70.

The above electrophotographic printer operates as follows.

Figure 2A:
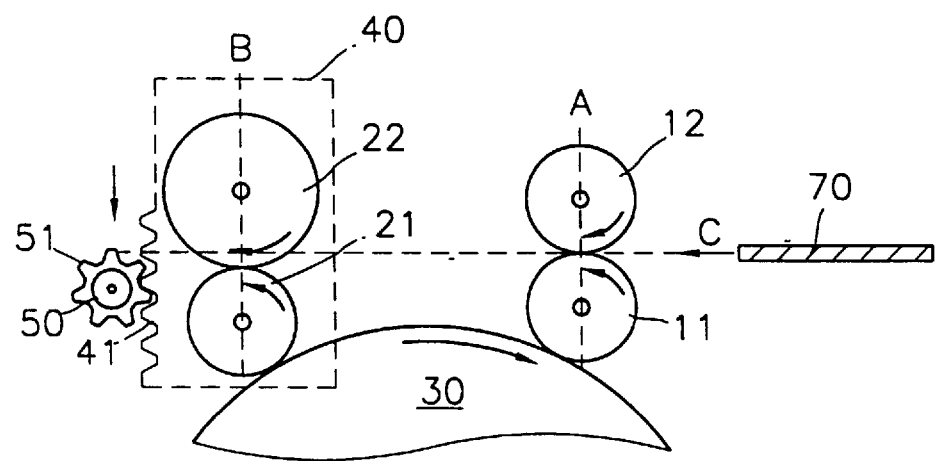
FIGS. 2A and 2B are side views illustrating the operation of the electrophotographic printer according to the present invention.

First, in order to transmit an image to be printed on the front surface of the paper 70 to the fourth transcription roller 22, the elevating motor 50 of FIG. 2A rotates clockwise to lower the bracket 40. Thus, the third transcription roller 21 contacts the photosensitive drum 30 and rotates. Accordingly, the image transcribed on the photosensitive drum 30 is transcribed to the third transcription roller 21, and then to the fourth transcription roller 22. At this time, the circumferential length of the fourth transcription roller 22 is greater than the length of the paper 70.

Figure 2B:
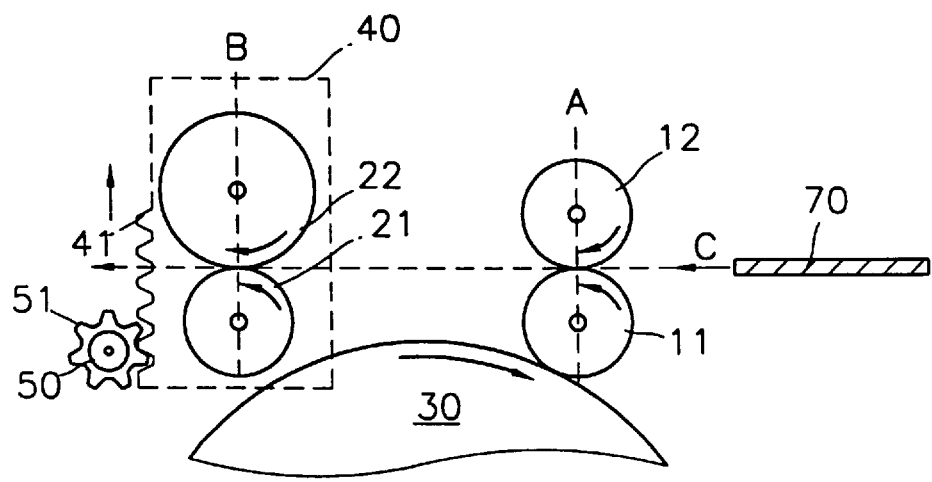

As described above, when the image to be printed on the front surface of the paper 70 has been transcribed to the fourth transcription roller 22, as shown in FIG. 2B, the elevating motor 50 then rotates counterclockwise, to elevate the bracket 40 such that the third and fourth transcription rollers 21 and 22 reach a height where the paper is supplied, which is represented by the horizontal dotted line. Accordingly, the third transcription roller 21 is detached from the photosensitive drum 30, and the driving motor. 60 driving the fourth transcription roller 22 stops, to thereby stop the rotation of the third and fourth transcription rollers 21 and 22.

Subsequently, an image to be printed on a rear surface of the paper 70 begins to be transmitted to the first transcription roller 11 through the driving photosensitive drum 30. The circumferential length of the photosensitive drum 30 is at least twice the length of the paper 70, so that an image to be printed on the front and rear surfaces of the paper 70 can be transcribed during one rotation of the photosensitive drum 30.

When the image transcribed to the first transcription roller 11 reaches a point "A" contacting the second transcription roller 12, the paper 70 is supplied in a direction "C", to print an image of the first transcription roller 11 on the rear surface of the paper.

When the paper 70 passing through the first and second transcription rollers 11 and 12 reaches a point "B" contacting the third and fourth transcription rollers 21 and 22, the driving roller 60 is driven, which drives the third and fourth transcription rollers 21 and 22. Accordingly, an image transcribed on the fourth transcription roller 22 is printed on the front surface of the paper 70. As described above, images transcribed onto the photosensitive drum 30 are sequentially printed on the rear and front surfaces of the paper 70.

The photosensitive drum 30, which is employed as a photosensitive device in an embodiment of the present invention, can be replaced by, for example, a photosensitive belt such as an OPC-belt.

According to the electrophotographic printer of the present invention, an image to be printed can be simultaneously printed on the front and rear surfaces of the paper by supplying paper to the printer only once.

It is contemplated that numerous modifications may be made to the electrophotographic printer of the present invention without departing from the spirit and scope of the invention as defined in the following claims.

What is claimed is:

1. An electrophotographic printer comprising:

a photosensitive drum in which first and second surface images for first and second surfaces, respectively, of a supplied paper to be printed become photosensitive;

a first print mechanism including a first transcription roller rotating in contact with said photosensitive drum and transcribing the first surface image from said photosensitive drum, and a second transcription roller rotating in contact with said first transcription roller to pass the supplied paper therebetween, thereby to print the first surface image transcribed by contact with said photosensitive drum on the first surface of the supplied paper; and a second print mechanism, installed at one side of said first print mechanism to selectively contact said photosensitive drum, for printing the second surface image transcribed from said photosensitive drum on the second surface of the supplied paper, said second print mechanism including:

a third transcription roller rotating selectively in contact with said photosensitive drum, and transcribing the second surface image from said photosensitive drum;

a fourth transcription roller having a circumferential length that is longer than a length of the supplied paper, rotating in contact with said third transcription roller and transcribing the second surface image from said third transcription roller;

a bracket supporting said third and fourth transcription rollers and operative to be lifted and lowered with respect to said photosensitive drum;

an elevating mechanism which elevates said bracket, to thereby enable said third transcription roller to selectively contact said photosensitive drum; and a driving source for driving at least one of said third and fourth transcription rollers.

2. An electrophotographic printer comprising:

a photosensitive device which comprises a rotatable photosensitive drum in which an image for one surface of a supplied paper to be printed and an image for an opposite surface of the supplied paper to be printed become photosensitive;

a first means for printing the image for the one surface and which is transcribed by contact with said photosensitive drum on the one surface of the supplied paper; and a second means installed at one side of said first print means to selectively contact said photosensitive drum, for printing the image for the opposite surface and which is transcribed from said photosensitive drum on the opposite surface of the supplied paper, wherein said first print means comprises:

a first transcription roller rotating in contact with said photosensitive drum and transcribing the image for the one surface of the supplied paper from said photosensitive drum; and a second transcription roller rotating in contact with said first transcription roller to pass the supplied paper therebetween.

3. An electrophotographic printer comprising:

a photosensitive device which comprises a rotatable photosensitive drum in which an image for one surface of a supplied paper to be printed and an image for an opposite surface of the supplied paper to be printed become photosensitive;

a first means for printing the image for the one surface and which is transcribed by contact with said photosensitive drum on the one surface of the supplied paper; and a second means, installed at one side of said first print means to selectively contact said photosensitive drum, for printing the image for the opposite surface and which is transcribed from said photosensitive drum on the opposite surface of the supplied paper, wherein said second print means comprises:

a third transcription roller rotating selectively in contact with said photosensitive drum, and transcribing the image for the opposite surface of the supplied paper from said photosensitive drum;

a fourth transcription roller having a circumferential length that is longer than a length of the supplied paper, rotating in contact with said third transcription roller and transcribing the image for the opposite surface of the supplied paper from said third transcription roller;

a bracket supporting said third and fourth transcription rollers and operative to be lifted and lowered with respect to said photosensitive drum;

an elevating mechanism which elevates said bracket, to thereby enable said third transcription roller to selectively contact said photosensitive drum; and a driving source for driving at least one of said third and fourth transcription rollers.

4. The electrophotographic printer of claim 3 wherein said elevating mechanism comprises:

a driving motor;

a pinion connected to a rotation shaft of said driving motor; and a rack formed on said bracket to engage with said pinion.

5. An electrophotographic printer comprising:

a photosensitive device which comprises a rotatable photosensitive drum in which an image for one surface of a supplied paper to be printed and an image for an opposite surface of the supplied paper to be printed become photosensitive;

a first means for printing the image for the one surface and which is transcribed by contact with said photosensitive drum on the one surface of the supplied paper; and a second means, installed at one side of said first print means to selectively contact said photosensitive drum, for printing the image for the opposite surface and which is transcribed from said photosensitive drum on the opposite surface of the supplied paper, wherein a circumferential length of said photosensitive drum is two or more times a length of said supplied paper.

* * * * *